United States Patent Office 3,198,189
Patented Aug. 3, 1965

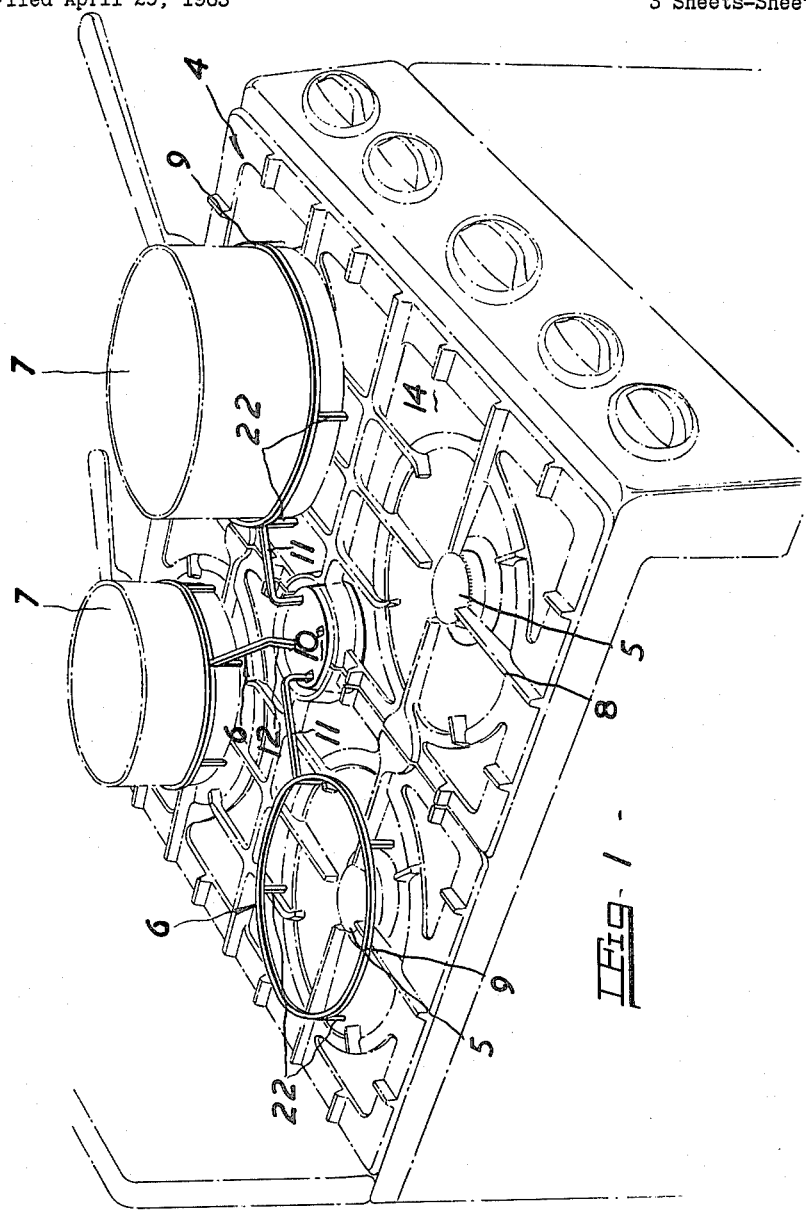

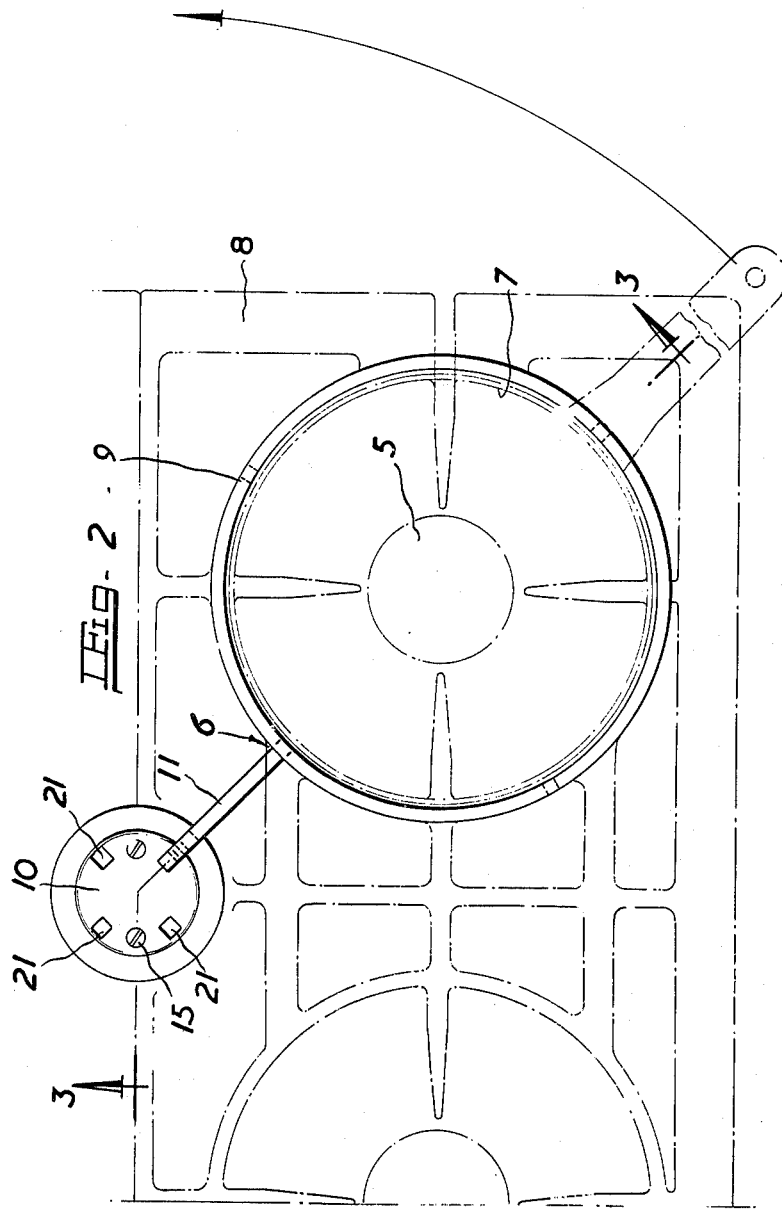

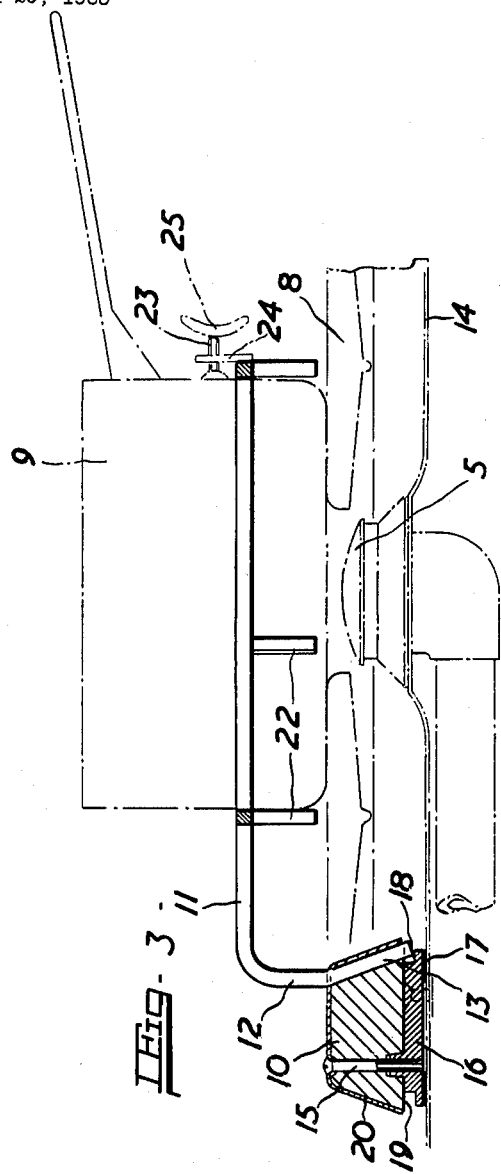

3,198,189
SAFETY DEVICE FOR COOKER HOBS
Arthur Frederick Oatley, Wilton Lodge, Wergs Road,
Tettenhall, Wolverhampton, England
Filed Apr. 29, 1963, Ser. No. 276,307
8 Claims. (Cl. 126—24)

This invention relates to a safety device for cooker hobs to reduce the risk of the overturning of saucepans or other cooking vessels being used on cooker hotplates whether gas, electric or solid fuel heated. Young children especially are liable to pull pans off the hob and spill the contents over themselves.

According to the present invention there is provided in or for a cooker hob a safety device against the overturning of pans on the hob comprising a ring adapted closely to encircle the pan and removably mounted, or adapted to be removably mounted, on the cooker so that the ring is spaced above a heating position of the hob, located firmly against lateral displacement but removable in an upward direction.

The ring restrains a pan encircled by it against lateral movement likely to lead to overturning yet, provided the ring fits freely around it, the pan can easily be put on and taken off the heating position vertically without disturbing the ring.

The ring may be hinged to a support about a horizontal axis enabling it to be swung up out of the way but is preferably completely detachable, when not required, for example by being supported on a non-circular portion detachably engaging a complementary receiving part in or on the hob. Similar receiving parts may be provided for locating a ring at each of the heating positions. A set of different diameter rings may be provided to suit a range of pan sizes. If the supporting portions for each ring size and their complementary receiving parts are the same, any of the rings can be used at any of the heating positions.

As a further refinement the ring may be provided with means for locating a saucepan handle to prevent rotation of the pan, for example a pair of upwardly directed lugs may be provided on the ring between which the handle is placed as the pan is put down on the heating position.

An embodiment of the invention will now be described by way of example with reference to the accompanying drawing, in which FIGURE 1 is a perspective view of a cooker hob having safety devices according to the present invention provided for locating pans at its heating positions against overturning.

FIGURE 2 is a plan view of one safety device.

FIGURE 3 is a section on line 3—3 of FIGURE 2.

In this embodiment the invention is applied to a hob 4 of a gas heated domestic cooker having four equally spaced burners 5 in association with each of which it is possible to provide a safety device 6. The purpose of the safety devices 6 is to retain, against overturning, saucepan 7 which may be removably mounted above the burners 5 on an open-work pan support 8 of the hob. Each safety device 6 comprises a ring 9 which is horizontally disposed and arranged to be spaced above a burner and a holder 10 which locates the ring 9 firmly against lateral displacement from its position above a burner, but permits removal of the ring in an upward direction. The ring 9 is made from a length of square-section wire bent at one end into a circle of appropriate diameter to encircle and lightly embrace the saucepan. At the closure of the ring the wire is welded. The other end of the wire is shaped to form a support 11 for the ring which engages the holder 10. From the ring 9 the wire extends at first radially away from the circle and then is bent downwards to form a substantially upright portion 12 of the support 11. The upright portion 12 of the support is bent again, FIGURE 3, so that its lower end 13 is inclined slightly towards the ring.

The holder 10 is disposed centrally in relation to the burners and is secured to a spillover tray 14 of the hob. The holder is of solid frusto-conical shape and is secured by screws 15 on a plinth 16 which is bolted to the spillover tray 14. A gasket 17 is interposed between the plinth and the spillover tray. The plinth 16 is of substantially the same diameter as the base of the holder 10 but a circumferential step 18 is formed around the upper edge of the plinth so that with the holder and the plinth secured together an annular recess 19 is formed between them. The sloping surface of the holder and the lower end 13 of the upright portion of the support 11 have the same angle of inclination. In the sloping surface of the holder four grooves are formed which open through the top and base of the holder and extend in the direction of the notional apex of the frusto-conical shape of the holder. These grooves are of the same cross-sectional shape as the square-section wire and are evenly spaced around the holder. A pressed sheet metal shell 20 fits over and embraces the top and sloping surface of the holder, being secured to the holder by the screws 15. Thus between the shell 20 and the grooves, sockets 21 are formed complementary in cross-section to the wire from which the ring and its support are formed. Openings are provided in the shell so that the sockets 21 open through the top of the shell. The sockets 21 are so disposed as to be engageable by the support of a ring positioned above each burner.

To mount the ring above a burner it is moved downwards in a mainly vertical direction but slightly inclined towards the burner to engage the inclined lower end 13 of the upright portion of the support in the appropriate socket 21. When the ring is in the desired position for retaining the saucepan the bottom of the inclined lower end 13 abuts the step 18 in the upper edge of the plinth 16 and further lowering movement of the ring is prevented. Owing to the support and socket being of complementary square shape the ring is firmly located against lateral displacement from its set position above the burner. When the ring is no longer required it can be disengaged from the holder and completely removed from the cooker if desired by lifting it in a direction mainly upwards but partly inclined away from the burner, until the lower end 13 of the upright portion of the support is free of the socket it had been engaging.

The set of rings for the four burners of the hob are all made from wire of the same square-section and the sockets in the holder are of the same cross-sectional shape. In this example the rings in the set are of different diameters for use with pans of varying sizes but the distance from the centre of the circle of each ring to the upright portion 12 of its support 11 is the same for all sizes. Therefore, because the holder is centrally disposed between the four burners so that the distance from the centre of each burner to the nearest socket in the holder is the same, any of the rings can be used at any of the four burners.

To locate a pan more firmly in position and further reduce the risk of overturning the pan depending lugs 22 are welded to the underside of the ring which embrace the pan and so restrict tilting of the pan from its upright position in the ring.

A pan may be still more firmly located in a ring if desired by providing on the ring, as shown in broken lines in FIGURE 3, a screw 23 which can be tightened against the wall of the pan. This screw 23 is disposed radially to the axis of the ring and passes through a tapped hole near the upper end of an upstanding lug 24 welded or otherwise secured to the ring. The screw has a winged head 25 so that it can be easily tightened by hand and the other end of the screw is enlarged and flattened to bear against the pan. A pan may alternatively be firmly located in a ring by a suitable cam arrangement provided on the ring instead of the screw clamp 23 previously described.

If desired, the holder, instead of being mounted above the spillover tray of the hob, may be secured below the tray and holes to the sockets be provided through the tray. Alternatively, if for example the tray were a casting, a part for locating the ring support may be cast integrally with the tray and have sockets formed in it for engagement by the lower end of the upright portion of the support for the ring.

I claim:

1. In a cooker having a hob including at least one pan heating means, a safety device to prevent the over-turning of a pan on the hob comprising a ring adapted closely to encircle the pan and provided with means for tightly holding the pan, a support rigid with the ring and an upwardly open socket rigid with the hob, the support being slidably engageable with and disengageable from the socket by respectively downward and upward movement of the support, the portions of the socket and the supports which are engageable being of comlementary non-circular cross-sectional configuration and equally spaced from the centers of the heating means and ring respectively and the support, by engagement with the socket, locating the ring centrally over the heating means and holding it firmly against lateral displacement.

2. In a cooker, a safety device according to claim 1 wherein the socket has an axis which is partly inclined away from the vertical in the direction away from the heating means and the portion of the support engageable with the socket is equally inclined to a line parallel to the central axis of the ring but in the direction towards the ring whereby the ring is horizontal when the support is engaged in the socket.

3. In a cooker having a hob including at least one pan heating means, a safety device to prevent the over-turning of a pan on the hob comprising a circular ring adapted closely to encircle the pan, a support rigid with the ring and an upwardly open socket rigid with the hob, the support being slidably engageable with and disengageable from the socket by respectively downward and upward movement of the support, the portions of the socket and the supports which are engageable being of complementary non-circular cross-sectional configurations and equally spaced from the centers of the heating means and ring respectively, the socket having an axis which is partly inclined away from the vertical in the direction away from the heating means and the support being equally inclined to a line parallel to the central axis of the ring but in the direction towards the ring whereby the ring is horizontal when the support is engaged in the socket whereby accidental displacement of the ring is resisted.

4. In a cooker a safety device according to claim 3 wherein the ring has vertically extending portions which embrace the pan and restrict tilting of the pan from its upright position in the ring.

5. In a cooker a safety device according to claim 3 wherein the ring is provided with means for tightly holding the pan.

6. In a cooker having a hob including a plurality of heating means grouped about a central position, a safety device to prevent the over-turning of pans on the hob comprising at least one pan-engaging member comprising a ring adapted closely to encircle the pan and a support rigid with the ring and having a depending terminal portion of a non-circular cross-section, and a holder at the central position, rigid with the hob and having a plurality of upwardly open sockets each associated with one of the heating means and spaced therefrom a distance substantially equal to the distance of the terminal portion from the center of the ring, and the sockets all having identical cross-sections complementary to the terminal portion of the support which is slidably engageable with and disengageable from any one of the sockets by respectively downward and upward movements of the support.

7. In a cooker a safety device according to claim 6 and including more than one pan-engaging member each as defined in claim 6, the pan-engaging members differing from one another in the diameter of their rings but being similar in the distance of the center of each ring from its associated terminal portion and in the cross-sections of the terminal portions.

8. A safety device to prevent the over-turning of a pan on the hob of a cooker comprising a ring adapted closely to encircle the pan and provided with means for tightly holding the pan, a support rigid with the ring and a holder having a socket and means for securing the holder to the hob with the socket upwardly open, the support being slidably engageable with and disengageable from the socket by respectively downward and upward movements of the support, the portion of the support engageable with the socket being of non-circular cross-sectional configuration and the socket being of complementary cross-section configuration.

References Cited by the Examiner

UNITED STATES PATENTS

| | | | |
|---|---|---|---|
| 1,645,466 | 10/27 | Westlake | 126—24 |
| 2,379,206 | 6/45 | Westlake | 126—24 |
| 2,448,417 | 8/48 | Cecchini | 126—211 X |

JAMES W. WESTHAVER, *Primary Examiner.*